(12) United States Patent
Kontogeorgopoulos (10) Patent No.: US 12,427,470 B2
(45) Date of Patent: Sep. 30, 2025

(54) METHOD AND ARRANGEMENT FOR PROCESSING A GAS MIXTURE

(71) Applicant: LINDE GMBH, Pullach (DE)

(72) Inventor: Eythymios Kontogeorgopoulos, Munich (DE)

(73) Assignee: Linde GmbH, Pullach (DE)

( * ) Notice: Subject to any disclaimer, the term of this patent is extended or adjusted under 35 U.S.C. 154(b) by 715 days.

(21) Appl. No.: 17/593,178

(22) PCT Filed: Mar. 12, 2020

(86) PCT No.: PCT/EP2020/025123
§ 371 (c)(1),
(2) Date: Sep. 10, 2021

(87) PCT Pub. No.: WO2020/182350
PCT Pub. Date: Sep. 17, 2020

(65) Prior Publication Data
US 2022/0184547 A1   Jun. 16, 2022

(30) Foreign Application Priority Data

Mar. 13, 2019 (EP) .................................... 19020124
May 24, 2019 (EP) .................................... 19020342

(51) Int. Cl.
*B01D 53/047* (2006.01)
*B01J 20/08* (2006.01)
(Continued)

(52) U.S. Cl.
CPC .......... *B01D 53/0476* (2013.01); *B01J 20/08* (2013.01); *B01J 20/18* (2013.01); *B01J 20/20* (2013.01);
(Continued)

(58) Field of Classification Search
CPC ............ B01D 53/0476; B01D 2253/10; B01D 2253/304; B01D 2253/34;
(Continued)

(56) References Cited

U.S. PATENT DOCUMENTS

2009/0071333 A1   3/2009  Labuda et al.
2009/0314159 A1*  12/2009 Haggerty ........... B01D 53/0423
                                                    96/121
(Continued)

FOREIGN PATENT DOCUMENTS

CN     104492405 B    1/2017
EP       1080771 B1   10/2007
(Continued)

*Primary Examiner* — Jennifer Dieterle
*Assistant Examiner* — Qianping He
(74) *Attorney, Agent, or Firm* — Millen, White, Zelano & Branigan; Brion P. Heaney (57) ABSTRACT

A method for processing a nitrogen-containing starting gas mixture by vacuum pressure swing adsorption, in which the starting gas mixture is temporarily guided under pressure in a main flow direction through an adsorption unit filled with an adsorbent material. The adsorbent material is provided, in a first region along the main flow direction, predominantly or exclusively in the form of first adsorption bodies; the adsorbent material is provided, in a second region along the main flow direction and downstream of the first region in the form of second adsorption bodies; that at least the second adsorption bodies are provided as composite bodies that have an inner core of a non-porous, non-adsorbent material and an outer layer formed from the adsorbent material; and that the second adsorption bodies have a lower proportion of the adsorbent material, in the body volume, than the first adsorption bodies.

19 Claims, 3 Drawing Sheets

(51) Int. Cl.
*B01J 20/18* (2006.01)
*B01J 20/20* (2006.01)
*B01J 20/32* (2006.01)

(52) U.S. Cl.
CPC ....... *B01J 20/3204* (2013.01); *B01J 20/3236* (2013.01); *B01J 20/324* (2013.01); *B01D 2253/10* (2013.01); *B01D 2253/304* (2013.01); *B01D 2253/34* (2013.01); *B01D 2257/102* (2013.01)

(58) Field of Classification Search
CPC ..... B01D 2257/102; B01J 20/08; B01J 20/18; B01J 20/20; B01J 20/3204; B01J 20/3236; B01J 20/324
USPC .......................................................... 96/96
See application file for complete search history.

(56) References Cited

U.S. PATENT DOCUMENTS

| | | | |
|---|---|---|---|
| 2012/0152115 A1* | 6/2012 | Gerds | B01J 20/12 96/132 |
| 2016/0175759 A1 | 6/2016 | Carstensen et al. | |
| 2021/0031171 A1* | 2/2021 | Stephenson | B01J 20/3238 |

FOREIGN PATENT DOCUMENTS

| | | | |
|---|---|---|---|
| EP | 2198946 A1 | 6/2010 | |
| FR | 2973719 A1 | 10/2012 | |

\* cited by examiner

METHOD AND ARRANGEMENT FOR PROCESSING A GAS MIXTURE

The present invention relates to a method for processing a gas mixture by pressure swing adsorption, in particular by vacuum pressure swing adsorption, and to a corresponding arrangement according to the preambles of the respective independent claims.

PRIOR ART

The production of air products in the liquid or gaseous state, for example of oxygen of different states of matter and degrees of purity, by cryogenic separation of air is known and is described, for example, in H.-W. Haring (editor), Industrial Gases Processing, Wiley-VCH, 2006, in particular section 2.2.5, "Cryogenic Rectification."

As an alternative to the cryogenic separation of air, gaseous oxygen of different degrees of purity can also be obtained from air by means of pressure swing adsorption (PSA), in particular by means of vacuum pressure swing adsorption (VPSA). VPSA differs from normal PSA in particular in that desorption takes place at a sub-atmospheric pressure level. With VPSA, higher oxygen yields can be achieved with lower energy consumption. Reference is made to technical literature for features and advantages of corresponding methods. Basic principles of adsorption methods can be found, for example, in A. Gabelman, Adsorption Basics: Part 1, CEP Journal, July 2017, pages 48 to 53, and A. Gabelman, Adsorption Basics: Part 2, CEP Journal, August 2017, pages 38 to 45.

The separation of air by means of PSA and VPSA is based on the adsorption of the air components to an adsorbent to varying degrees. In particular, oxygen-rich gas mixtures with, for example, approximately 90 to 95 mole percent oxygen content can be obtained from air by means of PSA or VPSA.

Although the present invention is described below predominantly with respect to the processing of air by means of VPSA, the measures proposed according to the invention can in principle also be used in connection with the processing of gas mixtures other than air by VPSA. The present invention is particularly suitable for nitrogen-rich gas mixtures with a nitrogen content of more than 40 mole percent, but is not limited to corresponding gas mixtures.

Adsorption takes place during PSA or VPSA typically using porous adsorbents. The proportions of the adsorbent components in a gaseous starting gas mixture, which are in each case adsorbed during PSA or VPSA, depend on the pressure of the starting gas mixture and on the selectivity of the adsorbent. A corresponding starting gas mixture is therefore subjected to compression before being supplied to PSA or VPSA.

Adsorption units used for processing air by means of PSA or VPSA typically comprise two successive adsorbent layers or packed beds or packed bed sections in the flow direction. A first, comparatively short layer is used to remove water and other strongly adsorbable air components, for example the usual humidity and traces of carbon dioxide. This first layer is followed in the flow direction by a second layer which is used to remove nitrogen. An equilibration zone and a mass transfer zone adjoining the equilibration zone in the flow direction are typically formed in the second layer, as is usual in adsorption methods. Further explanations regarding the formation of these zones can be found, for example, in Gabelman (see above) on page 50 in the section "Mass transfer considerations".

Different adsorbents or adsorbent materials (see also below) can be used for adsorption, as likewise known from the cited technical literature. Corresponding adsorbent materials can be provided, for example, in the form of spheres or pellets (hereinafter referred to simply as "adsorption bodies"), the diameter of which is typically between 1 and 3 mm. This diameter represents one of the main influencing variables on the separation characteristic of a corresponding adsorption unit.

With smaller diameters, an improved mass transfer typically takes place, but with a comparatively greater pressure loss across the adsorbent material. Larger particles cause lower pressure losses but exhibit poorer kinetic efficiency. The choice of the diameters of the adsorption bodies is therefore typically the result of a compromise between pressure loss and adsorption kinetics.

Recently developed further forms of adsorption bodies, in particular so-called core-in-shell composite bodies, are intended to improve mass transfer without negative influence on the pressure loss by the adsorption unit. In contrast to traditional adsorption bodies, which are formed substantially homogeneously from the porous adsorbent material, core-in-shell composite bodies are composite adsorption bodies having an inner core made of an (at least substantially) non-porous, non-adsorbent material and an outer layer formed by the respective adsorbent material. It is self-evident that when a "non-porous" and "non-adsorbent" material is referred to below, such a material can have a slight porosity and adsorption capacity, which is however much lower than a material referred to as "porous" and "adsorbent". As a rule, however, the inner core is formed from a completely non-porous material, for example a quartz grain. Alternatively, the term "inert" core is also used below.

For example, EP 1 080 771 B1 discloses a gas separation method comprising supplying a gaseous mixture containing at least two components having different adsorption properties into an adsorption container which contains a bed of at least one adsorbent material which can preferentially adsorb at least one of the gaseous components in the gaseous mixture, and subjecting the gaseous mixture to conditions which enable it to adsorb the preferentially adsorbable gaseous component in the gaseous mixture on the adsorbent material and to separate from the non-adsorbed component in the gaseous mixture passing through the adsorbent container, wherein at least one adsorbent material in the adsorbent container contains composite particles having an inner solid impermeable core, consisting of a non-porous non-adsorbent material, and at least one outer layer containing the adsorbent material.

Figure 4:
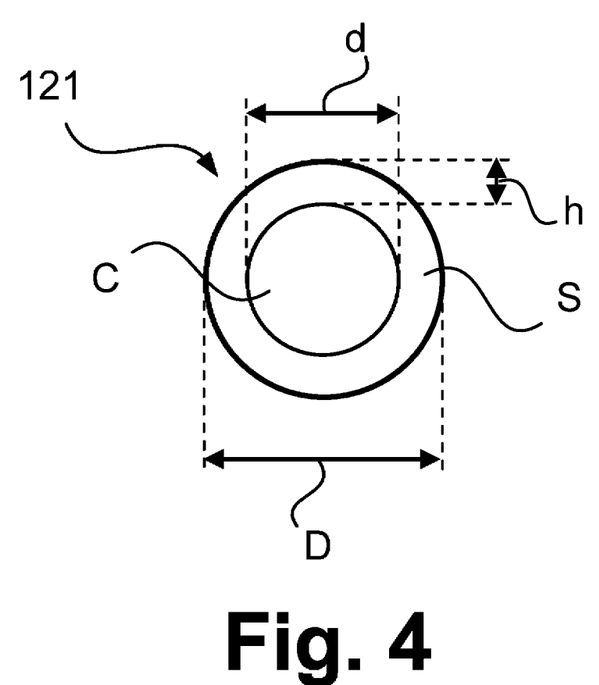
FIG. 4 shows an adsorption body designed as a composite body in a simplified schematic representation.

A corresponding composite body is illustrated in FIG. 4, to which reference should be made at this point. Further explanations can be found further below. In the production of core-in-shell composite bodies, the particle diameter (D, see FIG. 4) and the thickness of the outer layer (h) can be precisely determined. For this purpose, the diameter (d) of the inner core must be selected accordingly. In this way, core-in-shell composite bodies can be produced which have a variable thickness of the outer layer or a variable volume ratio between the adsorption material and the core. The mass ratio achieved thereby depends on the density of the core. The volume ratio is a constant geometric size and independent of the selected material of the core. The term "body volume" is therefore used below for a corresponding adsorption body. The body volume indicates the volume of a corresponding adsorption body (including the entire outer layer and the entire inner layer) enclosed by the outer boundary of the outer layer.

In contrast to the purification of other gas mixtures in which only traces of impurities have to be removed, the processing of air or comparable gas mixtures in order to obtain oxygen is subject to the challenge that the component to be removed is present in high concentration or even constitutes the main component. Due to the high nitrogen content, the equilibration zone forming in the layer explained above for removing nitrogen is significantly large, whereas the adjoining mass transfer zone is comparatively short and characterized by steep concentration gradients. Partially opposed objectives with regard to the respective properties result for the two zones and cannot be satisfactorily met using conventional methods.

The object of the present invention is therefore to create improved possibilities in this respect for processing gas mixtures, in particular air, by pressure swing adsorption, in particular by vacuum pressure swing adsorption, and to overcome the disadvantages of the prior art.

DISCLOSURE OF THE INVENTION

Said object is achieved by a method for processing a gas mixture, in particular a nitrogen-rich gas mixture such as air, by pressure swing adsorption, in particular by vacuum pressure swing adsorption, and by a corresponding arrangement according to the preambles of the respective independent claims. Preferred embodiments form the subject matter of the dependent claims and the following description.

In the following, some terms used in describing the present invention and its advantages, as well as the underlying technical background, will first be explained in more detail.

Where "PSA" or "VPSA" is referred to here, it should be understood to mean both a corresponding method or a corresponding method step and a technical device designed to carry out such a method or method step, i.e., an adsorption unit.

The adsorbent used in the PSA or VPSA is located in corresponding adsorption containers, wherein typically two or more adsorption containers are used for continuous production operation. The adsorption containers are alternately charged with the component(s) to be adsorbed from the gaseous, compressed starting gas mixture in an adsorption phase and regenerated in a desorption or regeneration phase, wherein between these two phases there can also be additional time periods, in which neither charging nor regeneration is carried out, and the adsorbent can, for example, be purged with further gas flows in order to carry out residues of the gas mixture to be separated.

In the aforementioned adsorption phase, the starting gas mixture is guided under pressure through the adsorption container until the containing adsorbent no longer has a sufficient receiving capacity for the adsorbed component(s). The supply of the gas mixture to be processed is therefore prevented, and a desorption of the adsorbed component(s) is effected by a pressure reduction in the desorption phase. VPSA differs from conventional PSA, as mentioned, substantially by the sub-atmospheric pressure level used in the desorption phase, which is also commonly referred to as "vacuum." In certain cases, for example in the extraction of oxygen from air, VPSA is distinguished by increased yields and a lower specific, i.e. product-related, energy requirement in comparison with conventional PSA.

In order to ensure a continuous production operation, the adsorption containers of a corresponding arrangement can be operated in an alternating operation in such a way that at least one of the adsorption containers is always in the adsorption phase and can thus deliver a product. In this case as well, however, time periods can occur in which no product is delivered, for example during pressure equalization or pressure buildup. For this case, product buffers, for example, can be used. However, this, and alternating operation in general, is not absolutely necessary.

Oxygen-rich air products accumulate in the PSA or VPSA in the adsorption phase due to the weaker adsorption of the oxygen and are therefore formed under a certain pressure which corresponds to the feed pressure into the PSA or VPSA minus pressure losses.

In the terminology used here, liquids and gases can also be enriched in or depleted of one or more components, wherein these terms refer to a content in a starting liquid or a starting gas from which the liquid or gas in question has been extracted. The liquid or the gas is enriched if it contains at least 1.1 times, 1.5 times, 2 times, 5 times, 10 times, 100 times, or 1,000 times the content, and depleted if it contains at most 0.9 times, 0.5 times, 0.1 times, 0.01 times, or 0.001 times the content of a corresponding component, based on the starting liquid or the starting gas. If, by way of example, reference is made here to "oxygen," this is also understood to mean a liquid or a gas which is rich in oxygen but need not consist exclusively of it.

The present application uses the terms pressure level and temperature level to characterize pressures and temperatures, which means that pressures and temperatures in a corresponding system do not have to be used in the form of exact pressure or temperature values in order to realize the inventive concept. However, such pressures and temperatures typically fall within certain ranges, which are, for example, ±1%, 5%, 10%, or 20% around an average. In this case, corresponding pressure levels and temperature levels can be in disjointed ranges or in ranges which overlap one another. In particular, pressure levels include unavoidable pressure losses. The same applies to temperature levels. The pressure levels indicated here in bar are absolute pressures.

An air product here is understood to mean a component or a component mixture in a gaseous or liquid state, which can be formed by separation of air (feed air), in particular by cryogenic separation or PSA or VPSA. An air product is therefore characterized in particular in that it has a different composition than atmospheric air but in particular does not have any additional components compared with atmospheric air.

Advantages of the Invention

As already explained, in a layer formed for removing nitrogen in a PSA or VPSA for processing air or a corresponding nitrogen-containing gas mixture, a comparatively large or long equilibration zone and a comparatively short mass transfer zone are formed, the latter being characterized by steep concentration gradients. The latter applies in particular to the end of the adsorption phase.

A low pressure loss and a high volumetric capacity for the nitrogen to be adsorbed should be present in the equilibration zone, while the mass transfer kinetics (still) play a smaller role in the equilibration zone. In contrast, there should likewise be a low pressure loss in the mass transfer zone but at the same time a low tendency of the adsorption bodies to mobilize (so-called "puckering" of the uppermost layer) and particularly advantageous mass transfer kinetics in order to achieve sufficient product purities. As mentioned at the outset, these are partially conflicting objectives if the single selection variable is only the size or the diameter of the adsorption bodies as controlled variables.

The present invention is now based on the finding that it is particularly advantageous, against the described background, to equip a region, corresponding to the equilibration zone, of an adsorption unit with homogeneous, conventional, in particular spherical adsorption bodies, but, on the other hand, to equip a region, corresponding to the mass transfer zone, with the core-in-shell adsorption bodies already explained at the outset. Alternatively, however, it is also possible for both zones to be provided with core-in-shell adsorption bodies which, however, have different ratios between the porous adsorbent material and the non-porous non-adsorbent material. Both zones are in each case successive zones, in the flow direction, of a layer which is designed to remove nitrogen from a corresponding gas mixture. In particular, this layer can adjoin, in the flow direction, a layer which is used to remove water and any impurities. However, the latter layer can also be omitted if applicable, for example if a dried or purified gas mixture is already used within the scope of the present invention.

Overall, the present invention proposes a method for processing a gaseous, nitrogen-containing starting gas mixture by pressure swing adsorption. As already mentioned several times, the starting gas mixture can in particular be air with the usual contents of oxygen, nitrogen, noble gases and other components; however, the present invention can in principle also be used for processing other, in particular correspondingly nitrogen-rich gas mixtures, as explained above. The pressure swing adsorption used within the scope of the present invention is in particular vacuum pressure swing adsorption; in a regeneration phase, a gas mixture at a sub-atmospheric pressure level is thus extracted from the adsorber containers or adsorption units used within the scope of the present invention, for which purpose a corresponding vacuum pump can be provided. As already mentioned above, reference is made to the relevant technical literature for further details of corresponding methods.

Within the scope of the present invention, the starting gas mixture used is temporarily guided under pressure in a main flow direction through an adsorption unit filled with an adsorbent material. As is generally known, adsorption arrangements used for processing gas mixtures can have two or more adsorption units (adsorption containers), which are then operated in alternating operation, as explained above. This can also be the case within the scope of the present invention. All explanations made for "one" adsorption unit therefore relate in the same way to a plurality of adsorption units in a corresponding arrangement. The "main flow direction" here refers to a direction along an axis between a feed point into the adsorption unit and an extraction point for the respective gas mixture. This main flow direction corresponds to the flow direction in which the gas molecules are guided or flow in a corresponding adsorption unit as a whole or in the form of a mean movement direction, irrespective of local disturbances and turbulences.

In order to overcome the disadvantages explained above, the present invention proposes that the adsorbent material is provided, in a first region along the main flow direction, in the adsorption unit predominantly or exclusively in the form of first adsorption bodies, and that the adsorbent material is provided, in a second region along the main flow direction and downstream of the first region, predominantly or exclusively in the form of second adsorption bodies. At least the second adsorption bodies, which lie further downstream, are provided according to the invention as composite bodies which have an inner core of a non-porous, non-adsorbent material and an outer layer having or formed from the adsorbent material. The second adsorption bodies in this case have a lower proportion of the adsorbent material, in the body volume, than the first adsorption bodies.

The first adsorption bodies, which lie further upstream, can also be provided as composite bodies and thus have an inner core made of a non-porous, non-adsorbent material and an outer layer having or formed from the adsorbent material. In this case, however, the inner core assumes a smaller proportion in the body volume in the first adsorption bodies than in the second adsorption bodies.

However, it is also possible for the first adsorption bodies to be provided in the form of homogeneous adsorption bodies having the adsorbent material or formed from the adsorbent material. In this case as well, the proportion of the adsorbent material in the body volume is thus lower in the second adsorption bodies than in the first adsorption bodies. These homogeneous adsorption bodies can in particular be spherical and have the dimensions explained below.

The composite bodies, which are used as second adsorption bodies and can also be used as the first adsorption bodies, are typical core-in-shell adsorption bodies, as described above with reference to the relevant patent literature. Reference is therefore explicitly made to the explanations above and in particular to FIG. 4.

Within the scope of the present invention, the first region corresponds in particular to the equilibration zone, and the second region corresponds in particular to the mass transfer zone in a corresponding adsorption unit or in its nitrogen removal layer. As explained, in the present case, in particular for processing air as the starting gas mixture, a further layer, in particular for removing water and other impurities, can be provided upstream of such a nitrogen removal layer. This is not necessarily the case if, instead of humid or contaminated air, already dried or purified air is supplied to the process.

The use of homogeneous first adsorption bodies having a relatively large particle diameter of more than 2 mm in the first region in particular allows a higher volumetric throughput and a lower pressure loss to be achieved by the present invention. By contrast, particularly good mass transfer kinetics can be achieved by using the second adsorption bodies designed as composite bodies in the second region. Thanks to the use of composite bodies, it is not necessary for second adsorption bodies to have a (relatively) small particle diameter of less than 2 mm, for example, in order to achieve this, since the inert core is present. This ensures that a low pressure loss and a lower risk of mobilization occur here. Since a corresponding second region lies downstream of the equilibration zone, the previously explained disadvantage of the lower quantity of adsorbent material plays a smaller role here, since significant depletion of nitrogen has already been achieved and therefore only the residual quantities of nitrogen have to be adsorbed. In this embodiment, the present invention thus combines the advantages of homogeneous adsorption bodies which lie, in connection with the present invention, in particular in their high quantity of adsorbent material with, at the same time, a readily adjustable pressure loss, with the advantages of corresponding core-in-shell adsorption bodies explained above. However, corresponding advantages also result analogously in the use of composite bodies as first adsorption bodies if they have a higher proportion of porous and adsorbent material than the second adsorption bodies.

The advantages achieved according to the invention are based in particular on the fact that, in particular at the end of an adsorption phase, an almost constant nitrogen concentration is established in the equilibration zone of a corresponding adsorption unit. The partial pressure, which represents the impelling force of the adsorption of nitrogen to the adsorbent material, is high enough for kinetic effects to play a secondary role and for a comparatively large amount of nitrogen to be adsorbed. On the other hand, the partial pressure of nitrogen in the mass transfer zone is much lower, and therefore rapid transfer kinetics are required. The latter are ensured in particular by the core-in-shell adsorption bodies without a risk of mobilization occurring in the process. These circumstances are also explained again in detail with reference to the attached FIGS. 2 and 3.

An additional advantage arising from the use of the composite bodies is the damping of the temperature fluctuations in the packed bed. Since the adsorption process is an exothermic process, the temperature of the adsorption material rises during adsorption. This increase in temperature acts as a brake for the adsorption process. When composite bodies are used, some of the resulting heat is conducted to the inner core. The temperature increase in the outer layer is therefore comparatively lower. A similar phenomenon can be observed when regenerating the material (desorption). Desorption is an endothermic process, and the temperature of the adsorption material decreases during desorption. The low temperature is in turn unfavorable for desorption. The temperature fluctuation is also limited here by the inner core. In both cases, the inner core thus acts to a certain extent as a buffer which limits the temperature fluctuations.

As already mentioned, the core-in-shell material of composite bodies consists of the non-adsorbent, non-porous inert core and the adsorbent, porous outer layer containing the adsorption material. The rapid kinetics are significantly determined by the thickness of this outer layer. In order to achieve a relatively thin outer layer, the volumetric proportion of the adsorption material in the second adsorption bodies in the second region should be up to 60%, for example 10 to 50% or 20 to 40% or approximately 50% of the body volume of the adsorption bodies.

As mentioned, the first adsorption bodies can be formed from a homogeneous material (volumetric proportion of adsorption material 100%), but also by a core-in-shell material. In the latter case, the outer layer of the adsorption bodies should advantageously be thick enough for the volumetric capacity not to decrease too much. This means that the volumetric proportion of the adsorption material should be at least 60%, for example 70 to 90% or approximately 80%.

The following table, which in part also uses the designations according to FIG. 4, indicates exemplary values for corresponding first and second adsorption bodies, which in this case are both designed as composite bodies.

TABLE 1

|  | First adsorption body | Second adsorption body |
| --- | --- | --- |
| Diameter of inner core (d) | 1.6 mm | 1.5 mm |
| Volume of inner core ($V_{core}$) | 2.1 mm$^3$ | 1.8 mm$^3$ |
| Diameter of composite body (D) | 2.5 mm | 2.0 mm |
| Body volume of composite body ($V_{body}$) | 8.2 mm$^3$ | 4.2 mm$^3$ |
| Thickness of outer layer (h) | 0.45 mm | 0.25 mm |
| Volume proportion of adsorption material | Approx. 74% | Approx. 57% |

Overall, within the scope of the present invention, a particularly high throughput of a corresponding arrangement can be achieved, in particular when using VPSA, wherein shorter cycle times can in particular be achieved. This leads to significantly reduced investment and operating costs.

Within the scope of the present invention, the adsorbent material can in particular be selected from the group consisting of activated aluminum oxide, zeolites, materials with mesopores, carbon molecular sieves, and mixtures thereof.

In contrast, the inner core of the composite bodies can in particular contain a material selected from the group consisting of metals, metal oxide, mixed oxides, dense ceramic oxides, such as corderite, perovskite, sintered clays such as kaolin, attapulgite, silicas, aluminum oxides, silica-aluminum oxide, silica-magnesium oxide, silica-zirconium oxide, silica-purium oxide, silica-beryllium oxide, and silica-titanium oxide, as well as ternary compositions such as silica-aluminum oxide-thorium oxide, silica-aluminum oxide, zirconium oxide, and mixtures thereof. Particularly advantageous properties of corresponding composite bodies can be achieved by using such materials.

Within the scope of the present invention, the first region and the second region can together have a (total) length of which the first region comprises 40 to 80%. In particular, the first region can be 0.5 times, 1 times, or 2 times as long as the second region, wherein intermediate values between the respectively mentioned values can also be included. The exact dimensions result in particular in a consideration of the equilibration zone and the mass transfer zone in a corresponding adsorption unit.

Within the scope of the present invention, the first region is thus particularly advantageously dimensioned such that it corresponds to an equilibration zone for nitrogen in the adsorption unit, and the second region is dimensioned in particular such that it corresponds to a mass transfer zone for nitrogen in the adsorption unit. The particular advantages of the respective selection of adsorption bodies in corresponding zones, as carried out according to the invention, have already been explained in detail above.

Within the scope of the present invention, it can be provided, in particular, to determine a length of the equilibration zone and a length of the mass transfer zone, in particular in advance, for which purpose experimental methods and/or simulative methods can be used. The determination of corresponding lengths or dimensions is easily possible for the person skilled in the art and does not require a complex and inventive step. Within the scope of the present invention, the first and second adsorption bodies can each be spherical and/or have a minimum diameter of 2 mm. The size of the second adsorption bodies can correspond to the size of the first adsorption bodies, or the second adsorption bodies can be smaller than the second adsorption bodies. A selection of the respectively suitable particle size depends in particular on the criteria explained above, in particular on the desired mass transfer kinetics in combination with the desired pressure loss.

As is generally known from the field of adsorption technology and is therefore mentioned here only for the sake of completeness, a plurality of adsorption units in a corresponding arrangement can in particular also be used within the scope of the present invention, and these can be operated in alternating operation. As also explained several times, air can in particular be used as the starting gas mixture, and the first and the second previously explained zones can be part of a nitrogen removal layer in a corresponding adsorption unit, which adjoins a water removal layer in the adsorption unit. In this case, the water removal layer can be equipped with a suitable adsorbent material which is suitable for removing water.

The present invention further extends to an arrangement for processing a gaseous, nitrogen-containing starting gas mixture. For further features of such an arrangement, reference is made to the corresponding independent claim. In particular, such an arrangement is designed for carrying out a method as previously explained in different embodiments. Reference is therefore explicitly made to the explanations above.

The invention will be described further hereafter with reference to the accompanying drawings, which show embodiments of the present invention.

DETAILED DESCRIPTION OF THE DRAWINGS

In the figures, components corresponding functionally or structurally to one another are indicated by identical reference signs and for the sake of clarity are not explained repeatedly. It is self-evident that, when components of arrangements and systems according to embodiments of the present invention are described below, these explanations relate to methods according to the invention and their embodiments in the same way.

The drawings respectively relate to embodiments in which the first adsorption bodies are designed as homogeneous adsorption bodies, i.e., not as core-in-shell or composite bodies. However, as mentioned, the present invention can also relate to such a case.

Figure 1:
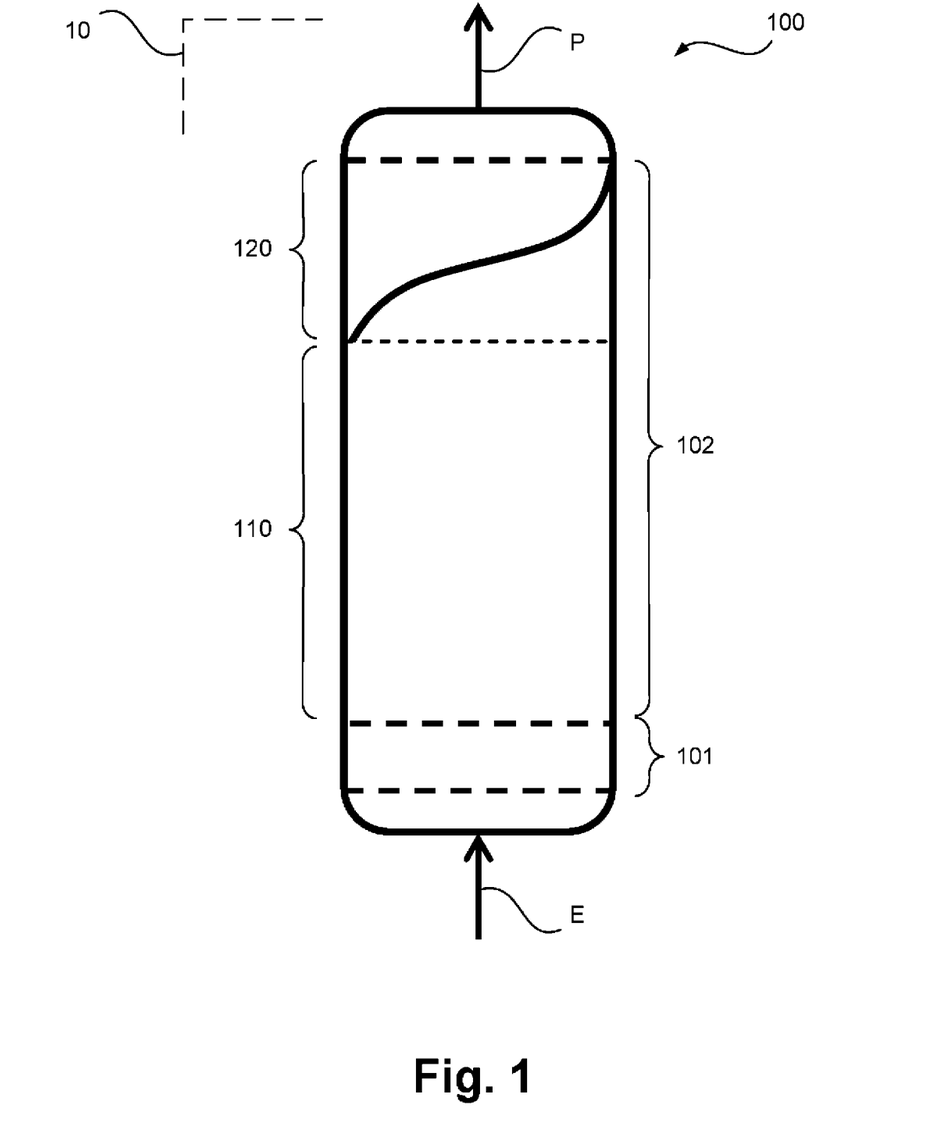
FIG. 1 shows an adsorption unit during use for processing air.

FIG. 1 schematically illustrates an adsorption unit during use for processing air according to an embodiment of the present invention and is designated as a whole by 100.

The adsorption unit 100 can in particular be part of an arrangement 10, which is indicated here only schematically and in which a plurality of adsorption units 100 can be arranged and can be operated in a manner known in principle. In the example shown, a starting gas mixture, in particular air, designated E is supplied to the adsorption unit 100.

The adsorption unit 100 is shown here in an adsorption phase of the type explained above so that a product mixture P is extracted therefrom. In a subsequent desorption or regeneration phase, however, adsorbed components are desorbed, in particular under a sub-atmospheric pressure level in the case of VPSA, from the adsorption material contained in the adsorption unit 100. By using the adsorption unit 100, the starting gas mixture E can be depleted of components which adsorb well to the adsorbent material, in the present case nitrogen, so that a product mixture P is enriched in oxygen or represents pure oxygen.

A first layer 101 and a second layer 102 are formed in the adsorption unit 100. The first layer 101 is a water removal layer previously explained several times and is equipped with a suitable adsorbent material for this purpose. The second layer 102 forms a nitrogen removal layer. The latter is considered in detail below.

In operation, an equilibration zone 110 and a mass transfer zone 120 form in the nitrogen removal layer 102, as is generally known from the field of adsorption technology. The equilibration zone 110 is characterized in particular by a constant or substantially constant nitrogen partial pressure, whereas the nitrogen partial pressure in the mass transfer zone 120 is reduced in the form of a steep gradient.

Figure 2:
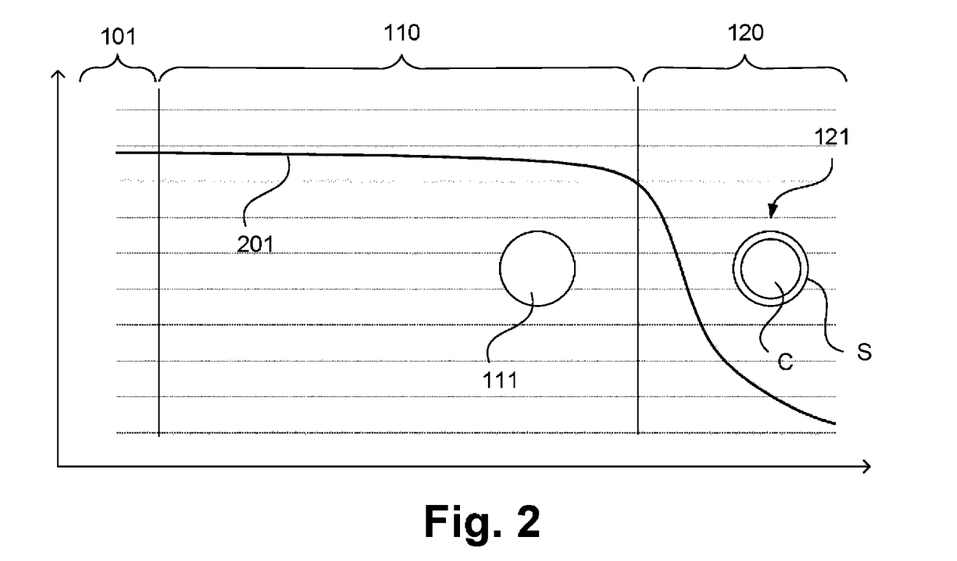
FIG. 2 shows a concentration gradient of nitrogen in an adsorption unit according to an embodiment of the invention.

FIG. 2 schematically illustrates a concentration gradient of nitrogen, at the end of the adsorption phase, in an adsorption unit according to an embodiment of the invention, for example adsorption unit 100 according to FIG. 1, in the form of a concentration diagram. In the diagram shown in FIG. 2, a length of the adsorption unit or of a corresponding adsorbent bed is shown on the abscissa against a nitrogen concentration in arbitrary units on the ordinate. Again, the water removal layer 101 and the equilibration zone 110 and the mass transfer zone 120 of the nitrogen removal layer 102 (not designated separately here) are shown. The nitrogen concentration curve is denoted by 201. As again illustrated separately here, homogeneous adsorption bodies 111 having an adsorbent material or formed from the adsorbent material are provided in the equilibration zone of the adsorption unit 100, whereas composite bodies 121 are provided in the second region, that is, in the mass transfer zone, wherein the composite bodies 121 comprise an inner core C of a non-porous, non-adsorbent material and an outer layer S having or formed from the adsorption material.

As can be seen in FIG. 2, the nitrogen concentration and thus the nitrogen partial pressure, at the end of the adsorption, is substantially constant in the gas phase in the equilibration zone 110 of the nitrogen removal layer 102. Since this nitrogen partial pressure represents the impelling force for the adsorption of nitrogen, it is sufficiently high for kinetic effects, as mentioned, to play a smaller role here and therefore for nitrogen simply to be adsorbed. This is in particular also clear from FIG. 3. On the other hand, the nitrogen concentration or the corresponding partial pressure in the mass transfer zone 120 is much lower and therefore rapid kinetics are required. As mentioned, the composite bodies used here meet these requirements.

Figure 3:
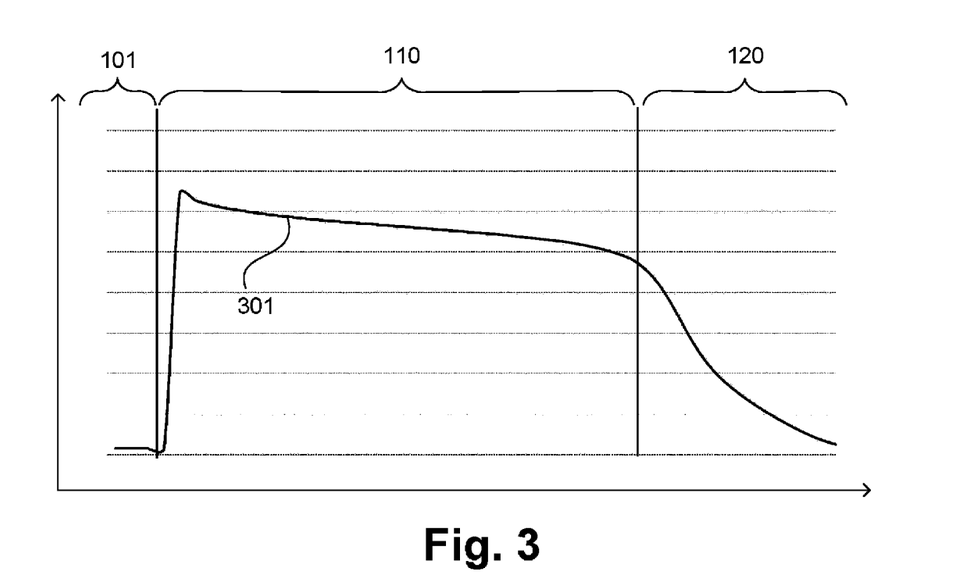
FIG. 3 shows charging with nitrogen in an adsorption unit according to an embodiment of the invention.

FIG. 3 illustrates the charging of an adsorption unit with nitrogen according to an embodiment of the invention in the form of a corresponding diagram. In the diagram according to FIG. 3, a length of an adsorption unit or of an adsorbent bed is again shown on the abscissa, but now against a value characterizing the charging of the adsorbent material on the ordinate. Again, the water removal layer 101 as well as the equilibration zone 110 and the mass transfer zone 120 of the nitrogen removal layer, which is also not designated separately here, are illustrated. A curve corresponding to the charging of the adsorbent material is indicated by 301. As can be seen in particular from FIG. 3, complete or almost complete charging of the entire equilibration zone with the adsorbent material is possible under the present conditions.

FIG. 4 shows an adsorption body designed as a composite body in a simplified schematic representation. This is designated as above by 121 and comprises an inner core C and an outer layer S. D denotes the diameter of the composite body 121, which defines the "body volume" within the meaning explained above. The diameter of the inner core C is denoted by d. This results in the thickness of the outer layer S to h.

The invention claimed is:

1. A method for processing a gaseous, nitrogen-containing starting gas mixture by pressure swing adsorption, said method comprising:

guiding the starting gas mixture under pressure in a main flow direction through an adsorption unit filled with an adsorbent material, wherein, in a first region along the main flow direction, the adsorbent material comprises first adsorption bodies, wherein, in a second region along the main flow direction and downstream of the first region, the adsorbent material comprises second adsorption bodies, and wherein the second adsorption bodies are composite bodies that have an inner core of a non-porous, non-adsorbent material and an outer layer having or formed from the adsorbent material, and that the second adsorption bodies have a lower proportion of the adsorbent material, with regards to body volume, than the first adsorption bodies, wherein the first adsorption bodies are homogeneous adsorption bodies comprising the adsorbent material.

2. The method according to claim 1, wherein the first adsorption bodies are also composite bodies having an inner core of a non-porous, non-adsorbent material and an outer layer having or formed from the adsorbent material, wherein the outer layer assumes a greater proportion of the body volume in the first adsorption bodies than in the second adsorption bodies.

3. The method according to claim 2, wherein the adsorbent material is 50 to 60% of the body volume of the second adsorption bodies and the adsorbent material is more than 70% of the body volume of the first adsorption bodies.

4. The method according to claim 1, wherein the first adsorption bodies have a diameter of more than 2 mm.

5. The method according to claim 1, wherein the adsorbent material is selected from activated aluminum oxide, zeolites, materials with mesopores, carbon molecular sieves, and mixtures thereof.

6. The method according to claim 1, wherein the inner core of the second adsorption bodies contains a material selected from metals, metal oxide, mixed oxides, dense ceramic oxides, perovskite, sintered clays, attapulgite, silicas, aluminum oxides, silica-aluminum oxide, silica-magnesium oxide, silica-zirconium oxide, silica-purium oxide, silica-beryllium oxide, silica-titanium oxide, silica-aluminum oxide-thorium oxide, silica-aluminum oxide, zirconium oxide, and mixtures thereof.

7. The method according to claim 1, wherein the first region has a length that is 40 to 80% of the total length of the first region and the second region together.

8. The method according to claim 1, wherein the first region is dimensioned such that the first region corresponds to an equilibration zone for nitrogen in the adsorption unit, and in which the second region is dimensioned such that the second region corresponds to a mass transfer zone for nitrogen in the adsorption unit.

9. The method according to claim 8, further comprising experimentally and/or simulatively determining a length of the equilibration zone and a length of the mass transfer zone.

10. The method according to claim 2, wherein the first and/or second composite bodies are each spherical.

11. The method according to claim 1, wherein air is used as the starting gas mixture.

12. The method according to claim 8, wherein the first and second regions are part of a nitrogen removal layer which adjoins a water removal layer in the adsorption unit.

13. The method according to claim 1, wherein the method is carried out as a vacuum pressure swing adsorption method.

14. An arrangement for processing a nitrogen-containing starting gas mixture by pressure swing adsorption, comprising:

an adsorption unit filled with an adsorbent material and having means designed to guide the starting gas mixture under pressure in a main flow direction through the adsorption unit, wherein, in a first region along the main flow direction, the adsorbent material comprises first adsorption bodies, wherein, in a second region along the main flow direction and downstream of the first region, the adsorbent material comprises second adsorption bodies, in which the second adsorption bodies are composite bodies having an inner core of a non-porous, non-adsorbent material and an outer layer having or formed from the adsorbent material, and the second adsorption bodies have a lower proportion of the adsorbent material, with regards to body volume, than the first adsorption bodies, wherein the first adsorption bodies are homogeneous adsorption bodies comprising the adsorbent material.

15. The method according to claim 1, wherein the inner core contains a material selected from metals, metal oxide, mixed oxides, corderite, perovskite, kaolin, attapulgite, silicas, aluminum oxides, silica-aluminum oxide, silica-magnesium oxide, silica-zirconium oxide, silica-purium oxide, silica-beryllium oxide, and silica-titanium oxide, silica-aluminum oxide-thorium oxide, silica-aluminum oxide, zirconium oxide, and mixtures thereof.

16. The method according to claim 10, wherein the first and/or second composite bodies each have a minimum diameter of 2 mm.

17. The method according to claim 2, wherein the first and second composite bodies each have a minimum diameter of 2 mm.

18. The method according to claim 1, wherein the adsorbent material is 10 to 50% of the body volume of the second adsorption bodies, and the adsorbent material is more than 70% of the body volume of the first adsorption bodies.

19. The method according to claim 1, wherein the adsorbent material is 20 to 40% of the body volume of the second adsorption bodies, and the adsorbent material is more than 70% of the body volume of the first adsorption bodies.

* * * * *